(12) United States Patent
Knapp et al.

(10) Patent No.: US 9,073,558 B2
(45) Date of Patent: Jul. 7, 2015

(54) TAB WELDED TURNTABLE

(71) Applicants: Ryan Knapp, Sandy Hook, CT (US); Peter McGonagle, Southport, CT (US); Timothy Gonsowski, Danbury, CT (US)

(72) Inventors: Ryan Knapp, Sandy Hook, CT (US); Peter McGonagle, Southport, CT (US); Timothy Gonsowski, Danbury, CT (US)

(73) Assignee: THE MACTON CORPORATION, Oxford, CT (US)

(*) Notice: Subject to any disclaimer, the term of this patent is extended or adjusted under 35 U.S.C. 154(b) by 160 days.

(21) Appl. No.: 13/804,886

(22) Filed: Mar. 14, 2013

(65) Prior Publication Data

US 2014/0261106 A1   Sep. 18, 2014

(51) Int. Cl.
*B61J 1/04*   (2006.01)

(52) U.S. Cl.
CPC .............. *B61J 1/04* (2013.01); *Y10T 29/49968* (2015.01)

(58) Field of Classification Search
CPC ............... B60S 13/02; B61J 1/04; B61J 1/00; E04B 2/18
USPC ........................ 104/35, 44, 45, 46, 40, 36, 43; 238/10 A, 10 B, 10 C; 52/844, 854, 839, 52/838
See application file for complete search history.

(56) References Cited

U.S. PATENT DOCUMENTS

| 1,094,026 | A | * | 4/1914 | Simmonds | ...................... 104/35 |
| 1,772,858 | A | * | 8/1930 | Coffey | ............................ 104/44 |
| 6,877,437 | B2 | | 4/2005 | Murdock | |
| 7,631,602 | B2 | | 12/2009 | Schwenker | |
| 2011/0039062 | A1 | * | 2/2011 | Bishop | .......................... 428/131 |

* cited by examiner

*Primary Examiner* — Mark Le
(74) *Attorney, Agent, or Firm* — St. Onge Steward Johnston & Reens LLC

(57) ABSTRACT

A turntable assembled from a plurality of flat sheet metal parts where the sheet metal parts include a series of voids and/or protrusions. The protrusions insert into the voids so that some flat sheet parts are disposed in a vertical orientation and some in a horizontal orientation, the vertical parts substantially perpendicular to the horizontal parts. The flat sheet parts are welded together to create a support structure with the voids and protrusions interacting to align the flat sheet parts within required manufacturing tolerances. One of the horizontally disposed parts has holes therein for attaching the support structure to a hub to create a rotating turntable.

18 Claims, 11 Drawing Sheets

TAB WELDED TURNTABLE

FIELD OF THE INVENTION

The invention is related to turntables and a method of manufacture thereof.

BACKGROUND OF THE INVENTION

Rotating devices such as turntables are used in a variety of applications to turn heavy equipment, vehicles, machinery, buildings, seating or other items that are difficult to turn due to weight, space constraints or directional constraints. For example, a rail car engine can be turned on a turntable to quickly re-orient the engine or switch tracks in a rail yard. Turntables may also be used in revolving restaurants, dance floors, stadium seating, auditoriums, homes and other applications where large items need to be rotated or positioned. Rotating devices are often built for the custom needs of each application, whether it be a turntable for positioning manufacturing equipment in a factory or a turntable for positioning rail cars, buildings or other machinery, each application may have different requirements such as size, height and load bearing capacity.

U.S. Pat. No. 7,631,602 to Schwenker discloses a low profile turntable device having concentric circular and perpendicular lateral band systems for mounting the turntable on a surface. The concentric and perpendicular lateral bands are joined with a clip. The concentric and perpendicular lateral bands generally lie in the same plane and are joined to create a generally two dimensional structure of sheet metal parts.

U.S. Pat. No. 6,877,437 to Murdock discloses a modular, flexible turntable that is designed to be mounted to an uneven surface. A series of petals extend outwards and are attached to a central disk. The attachment point between the petals and the disc is flexible, and the petals and disc may be fastened together using welding.

Other versions of turntables are assembled from a series of I-Beam structures that are cut and fit to create a rounded support structure. An example of a prior art turntable is shown in FIGS. 5A and 5B, and described in detail below. The support structure of the turntable is designed to support the load of the item to be placed on the turntable. Often, the item is heavy and requires a substantial support structure. For example, the item may be a rail car engine.

The I-Beams and flat metal parts are cut and fit so that the parts can be joined. Often, tolerances associated in forming I-Beams are not acceptable for producing machinery that is designed to move. On the other hand, custom formed I-Beams with tighter tolerances are a prohibitively expensive alternative. Since each part is aligned and welded individually, and the tolerances, straightness and flatness of the beams are not high enough, the fitting and cutting process is extremely labor intensive. The final structure may also have an outer ring formed from a rolled structural member affixed to the outside of the turntable. If the turntable is for rail cars, a track must also be affixed to the turntable, typically directly above the underlying I-Beams of the support structure.

Prior art turntables also require repeated measurements to check the center and alignment of the pieces of the turntable as the turntable is assembled. Often, these repeated measurements are done by a worker who specializes in welding. A turntable and method of manufacture thereof that make more efficient use of specialized labor is desired to increase efficiency in production.

There is a need for an improved turntable and manufacturing method thereof that overcomes the disadvantages of the prior art. It is desirable to manufacture a turntable using a method that achieves tolerance requirements with less time devoted to measuring, cutting and fitting. It is further desirable to construct a turntable using a method that requires reduced fitting and alignment skills from workers in order to assemble the turntable. It is further desirable to construct a turntable using a method that allows for reduced lead times during manufacturing.

SUMMARY OF THE INVENTION

An object of the present invention is to provide a turntable and manufacturing method thereof, the turntable assembled from a series of flat metal parts to form a 3-dimensional load bearing structure.

Another object of the present invention is to provide a turntable and manufacturing method thereof, the turntable having a reduced requirement for skilled labor to cut and fit flat and beam pieces that make up the turntable.

Another object of the present invention is to provide a turntable and manufacturing method thereof which allows the turntable to be more easily customized than prior art turntables.

Another object of the present invention is to provide a turntable and manufacturing method thereof that allows for a more efficient use of material in comparison with prior art turntables and manufacturing methods thereof.

Another object of the present invention is to provide a turntable and manufacturing method thereof, the turntable constructed from sheet metal or metal plate parts having a series of tabs and voids for aligning the parts during assembly and welding.

Another object of the present invention is to provide a turntable and manufacturing method thereof, where parts making up the turntable may be cut using 2-dimensional cutting tools such as a water jet cutter, laser cutter, or a plasma cutter.

These and other objects are achieved by providing a turntable having a hub with a plurality of holes therein. The holes are adapted to receive bolts for affixing the hub to a foundation. A support structure attached to the hub, has a plurality of horizontal members with a plurality of voids, and a plurality of vertical members disposed between and substantially perpendicular to, two of the horizontal members. A protrusion extends from an edge of each vertical member, the protrusion is inserted into one of the voids and the vertical members are joined to the horizontal members.

Further objects are achieved by providing a turntable having a hub with a plurality of holes therein. The holes are adapted to receive bolts for affixing the hub to a foundation. A support structure attached to the hub, has a plurality of horizontal members with a plurality of voids. The voids are disposed in a radial pattern about the horizontal member. A plurality of vertical members are disposed between and substantially perpendicular to, two of the horizontal members. A protrusion extends from an edge of each vertical member, the protrusion is inserted into one of the voids. Each vertical member and each horizontal member is joined along the intersection.

The voids can extend through the horizontal member, and the horizontal member can have holes for attaching the horizontal member to the hub. A drive mechanism rotates the support structure about the hub, and track is attached to one the horizontal members and the track can be adapted to receive rail cars, maintenance cars, material handling cars and other machinery. The turntable can also have two tracks perpendicular to each other, with a support structure supporting each of the tracks. Further, a side support and side part can be attached to the side of the support structure. The side part is parallel to the horizontal member.

Yet further objects of the present invention are achieved by providing a method of manufacturing a turntable having the steps of: Providing a hub having a plurality of holes adapted to receive bolts for affixing the hub to a foundation; providing a plurality of vertical members each having an edge with a protrusion; providing a plurality of horizontal members each having a plurality of voids; placing the vertical members substantially perpendicular the horizontal members, such that a protrusion in the vertical member inserts into a void in the horizontal member; welding the vertical members to the horizontal members; and attaching the hub to one the horizontal members.

The attaching step can include bolts extending through holes in the hub and holes in one of the horizontal members. Another step includes affixing a drive mechanism to the turntable for rotating the turntable.

DETAILED DESCRIPTION OF THE INVENTION

Figure 1:
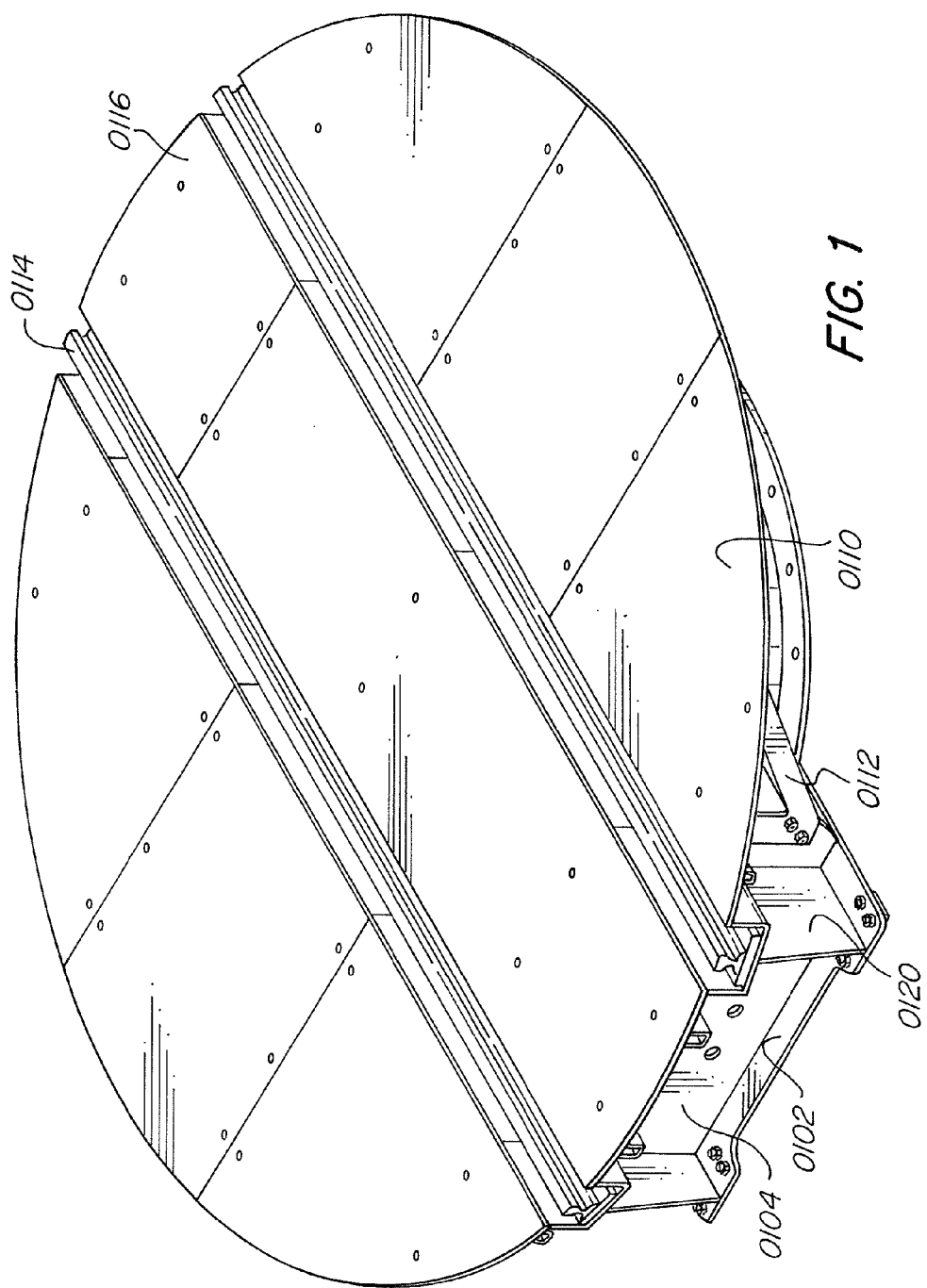
FIG. 1 is a top perspective view of an assembled turntable.

FIG. 1 is a perspective view of an assembled turntable. A bottom horizontal member 0102 is mounted to a hub (not shown). Lateral vertical members 0104 are affixed between the bottom horizontal member 0102 and a top horizontal member. Longitudinal vertical members 0120 are affixed between the bottom horizontal member 0102 and a top horizontal member. The hub (not shown) is driven by a drive mechanism such as a motor (not shown). Additional drive mechanism options are contemplated such as a hand or machine crank gearing system, levers and the like as would be apparent to one of skill in the art. Rails 0114 are attached above the top horizontal member 0218 (see FIG. 2). The rails 0114, allow a rail car, locomotive or other railway vehicle to travel on the turntable. A cover 0116 may be placed between the rails to cover gaps for safety purposes. Side supports 0112 may be affixed to the side of the support structure. Side parts 0110 are affixed to the side supports 0112. The side parts 0110 may be removable to allow for inspection of the drive mechanism or other parts of the turntable assembly.

Figure 2:
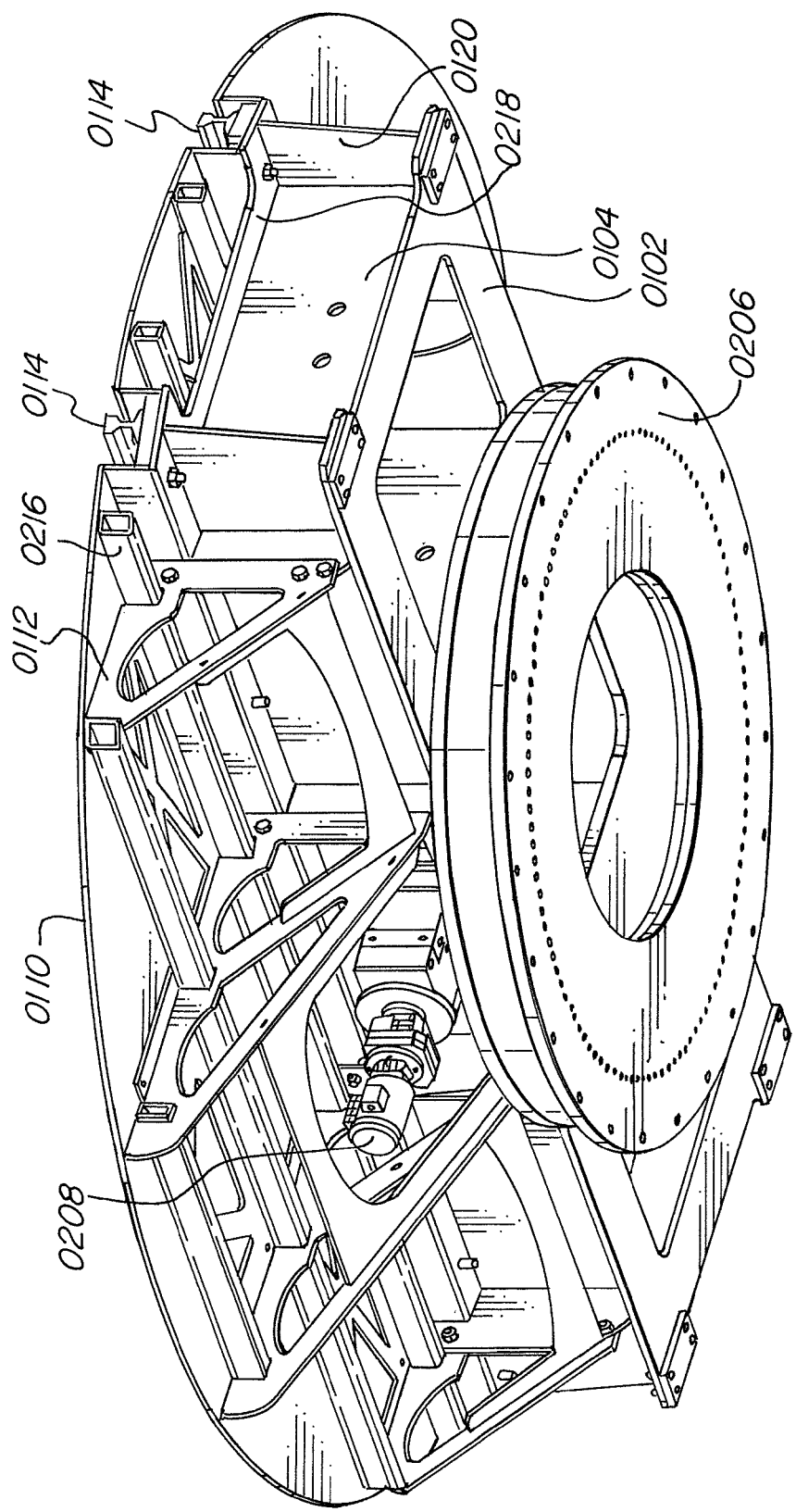
FIG. 2 is a bottom perspective view of the turntable of FIG. 1.
Figure 3:
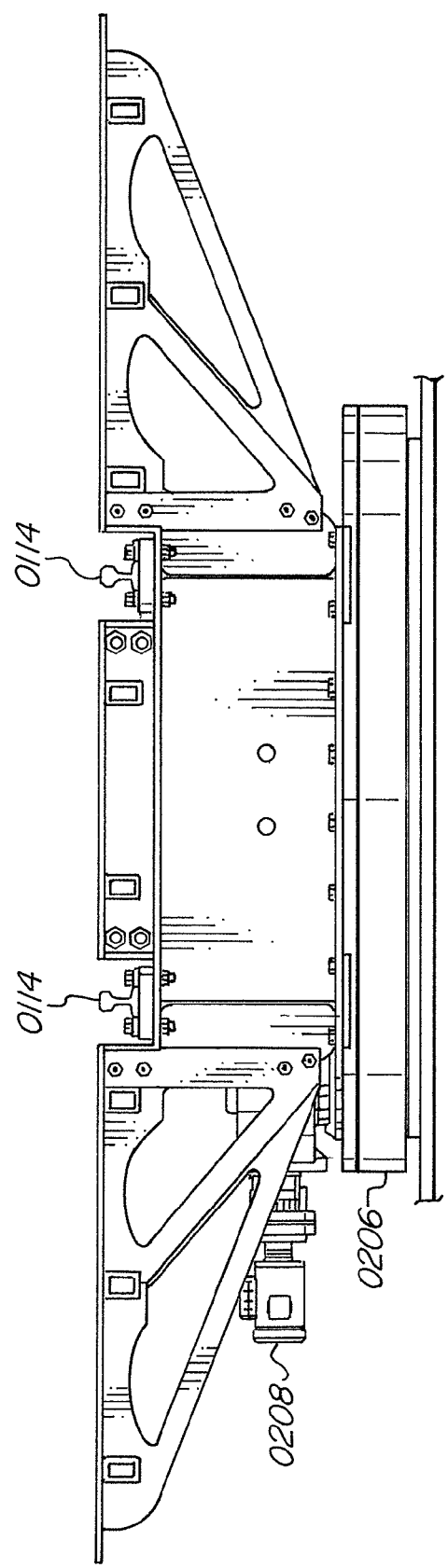
FIG. 3 is a side view of the turntable of FIG. 1.

Referring to FIGS. 2 and 3, a drive mechanism such as a motor 0208 rotates the turntable about a hub 0206. The side supports 0112 may also include beam members 0216. These beam members 0216 may be square, rectangle or other cross sections. The beam members 0216 add stiffness and strength to the side support structure and the side parts.

Figure 4:
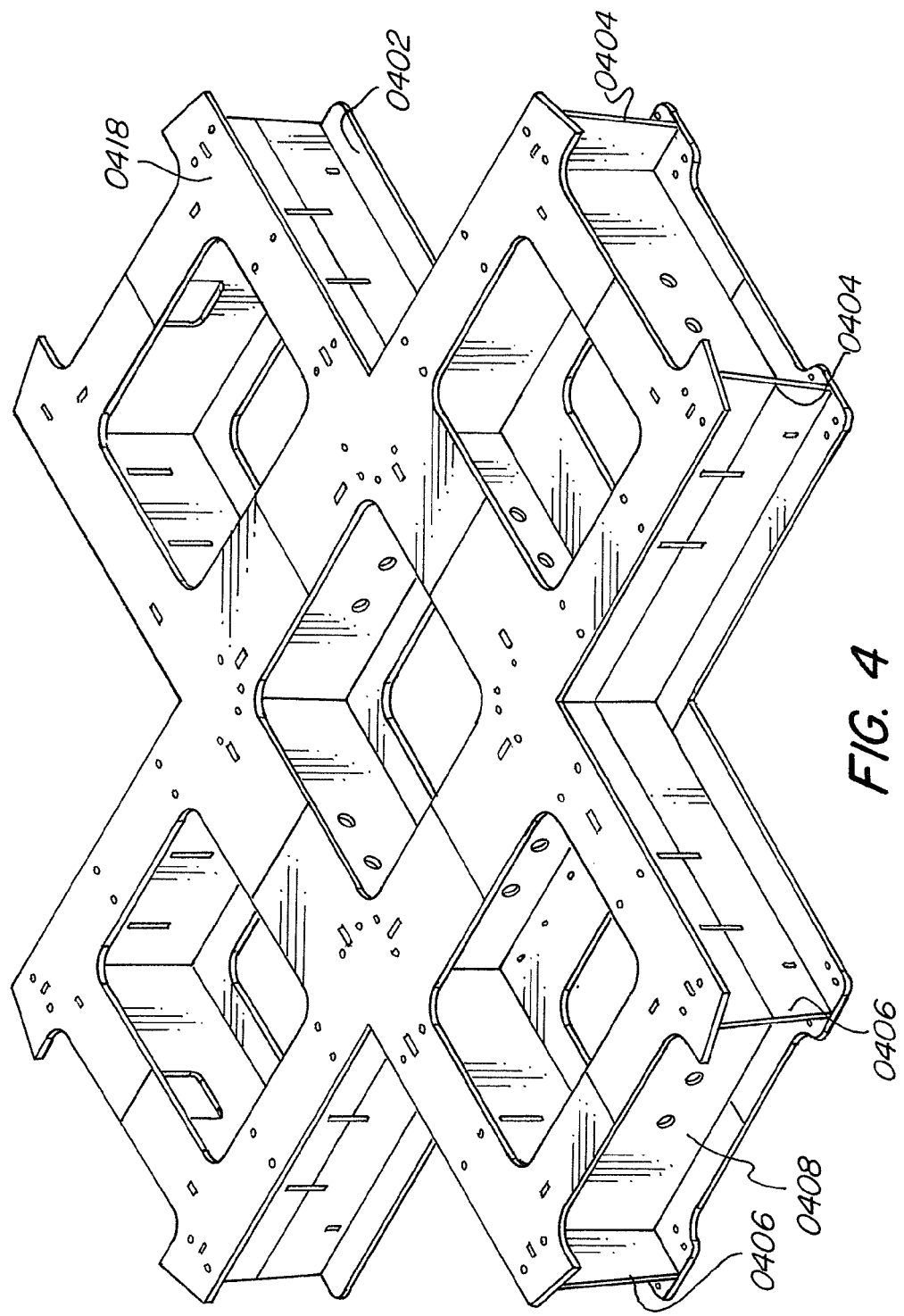
FIG. 4 is a perspective view of an alternate embodiment of the invention shown in FIG. 1.

FIG. 4 shows a perspective view of a partially assembled turntable having two tracks. A continuous vertical member 0404, vertical arm members 0406 and lateral vertical members 0408 are affixed between a bottom and top horizontal members 0402 and 0418 respectively. Protrusions extend from the edge of the continuous vertical member 0404, the vertical arm members 0406 and the lateral vertical members 0408. Each protrusion inserts into a corresponding void of the bottom 0402 and top 0418 horizontal members. The continuous 0404, arm 0406, and lateral 0408 members are joined to the bottom 0402 and top 0418 members to create a support structure for a two track turntable. A hub and drive mechanism similar to that of FIG. 2 is attached to the two track support structure. Further, tracks are attached to the top of the support structure to create a revolving turntable having two tracks.

Figure 5A:
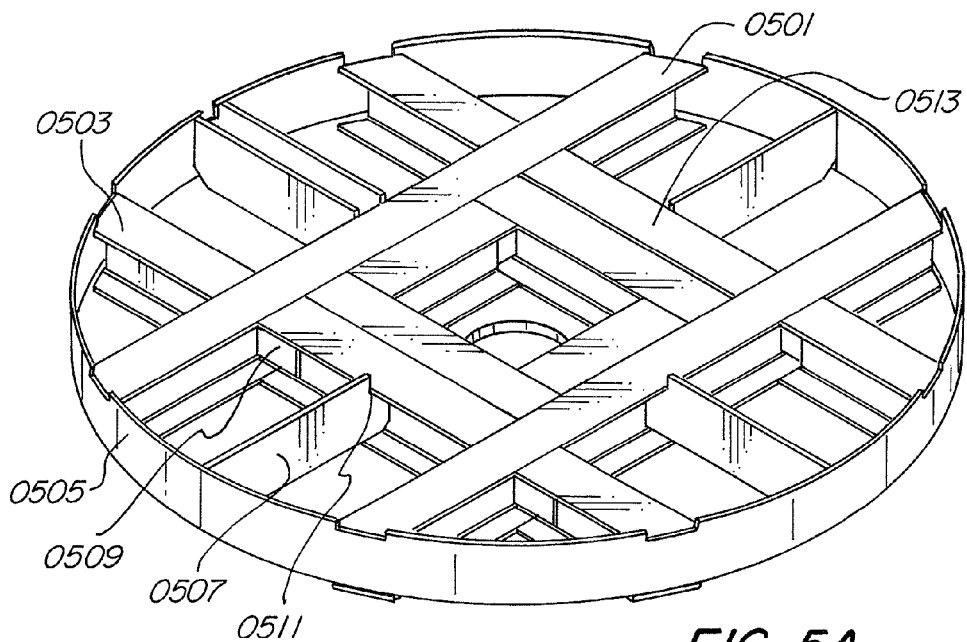
FIG. 5a is a top perspective view of a prior art turntable.
Figure 5B:
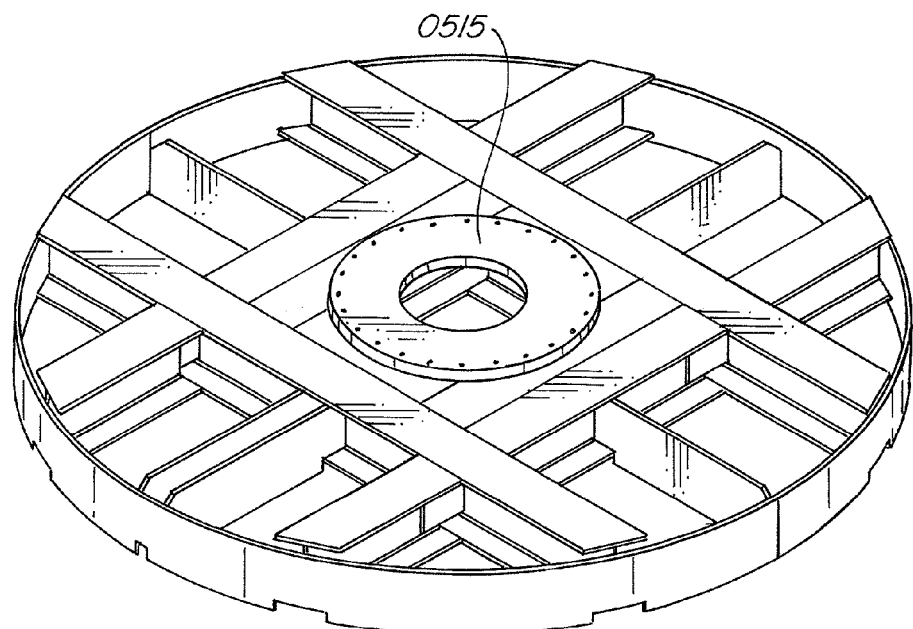
FIG. 5b is a bottom perspective view of a prior art turntable.

FIGS. 5a and 5b are, respectively, top and bottom perspective views of a prior art turntable manufactured with an old method. The turntable has main beams 0501 that are welded to secondary beams 0503. The secondary beams are cut and joined to fit the main beams 0501. Additional plates 0509 may be needed to strengthen the joint. A bent sheet 0505 is attached to the outside of the main beams 0501 and secondary beams 0503 to create a rounded structure. Additional support plates 0507 may be necessary to secure the rounded structure. Additional support plates 0507 must be notched 0511 to attach to secondary beams 0503. Main beams 0501 and secondary beams 0503 attach to a hub 0515. The hub 0515 is affixed to a hub (not shown) and a drive mechanism (not shown) rotates the turntable. The hub 0515 must be aligned according to the center of the turntable so that the turntable rotates properly around the axis of the hub. The process of finding center of the turntable is labor and time intensive, thus adding to the cost of the turntable.

Figure 6:
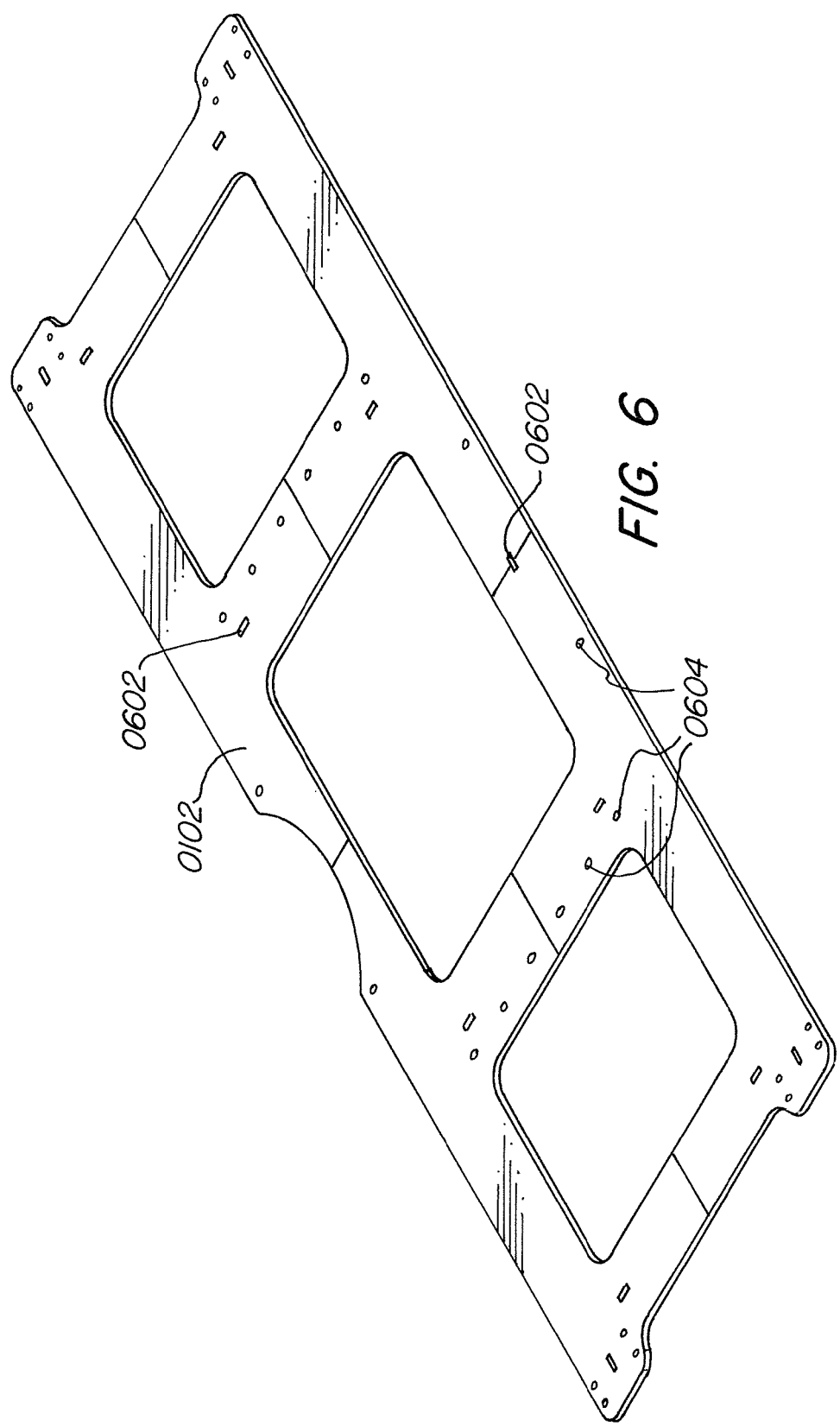
FIG. 6 is a perspective view of a bottom horizontal member shown in FIG. 1.

FIG. 6 is a perspective view of a bottom horizontal member shown in FIG. 1. The horizontal member 0102 has a plurality of holes 0604 for securing the horizontal member to a hub (not shown). The holes 0604 are already cut to receive a hub, and it is therefore not necessary to measure the center of the turntable during assembly. The center is already built into the horizontal member 0102 and the holes 0604. The horizontal member 0102 also has a series of voids 0602 for receiving tabs (not shown) from vertical members (not shown). The voids 0602 are also designed relative to center to ensure that the turntable, once assembled will rotate within tolerance requirements, with a reduced need to check and re-check center measurements during assembly.

Figure 7:
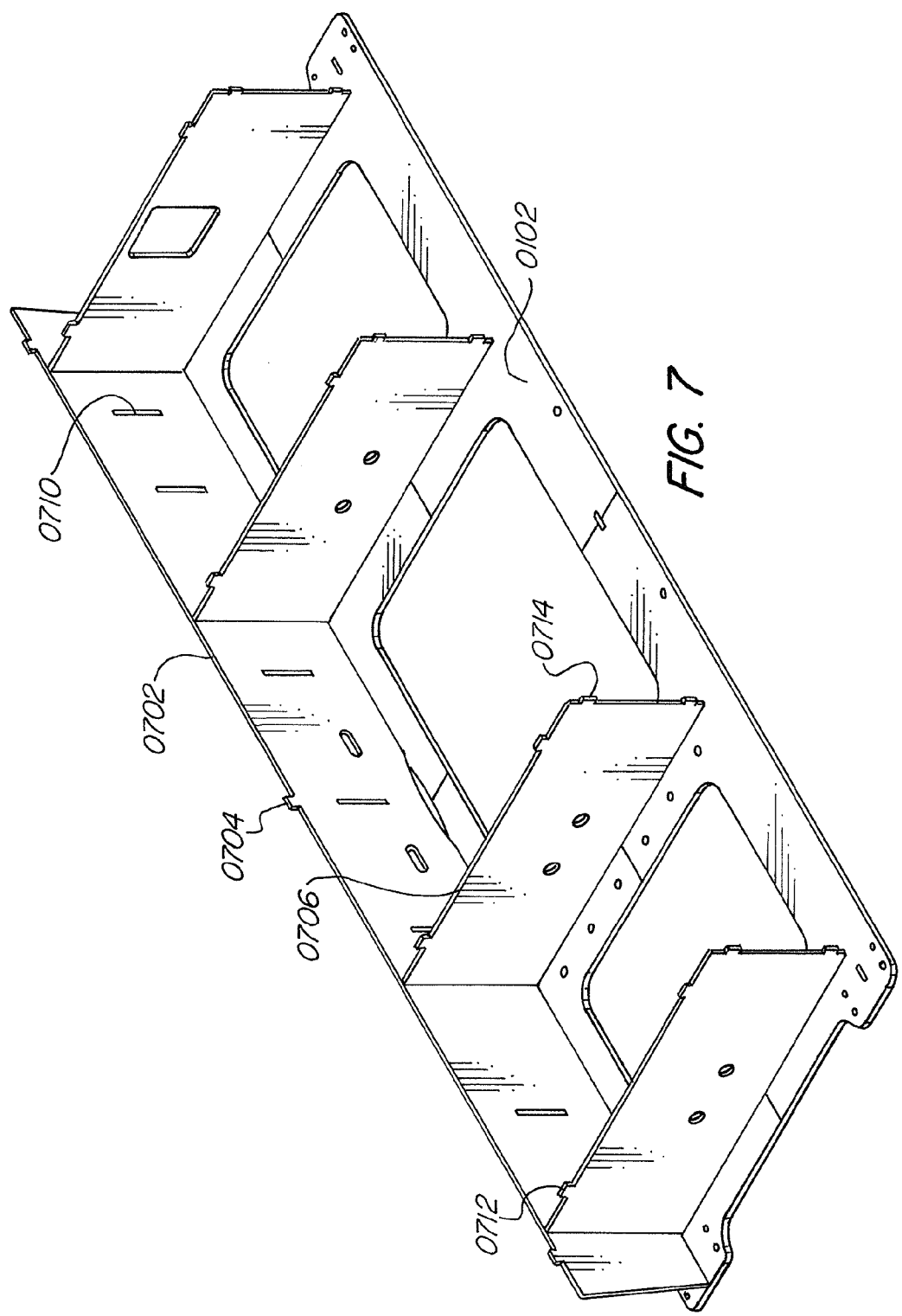
FIG. 7 is a perspective view of a partially completed turntable of FIG. 1.

FIG. 7 is a perspective view of a partially completed turntable of FIG. 1. Lateral vertical members 0706 have top tabs 0712 that insert into voids in a horizontal member 0102. Lateral vertical members 0706 also have side tabs 0714. Side tabs 0714 insert into voids in longitudinal members 0702. Longitudinal members 0702 have rail support voids 0710 for receiving a tab from a rail support member (not shown).

Figure 8:
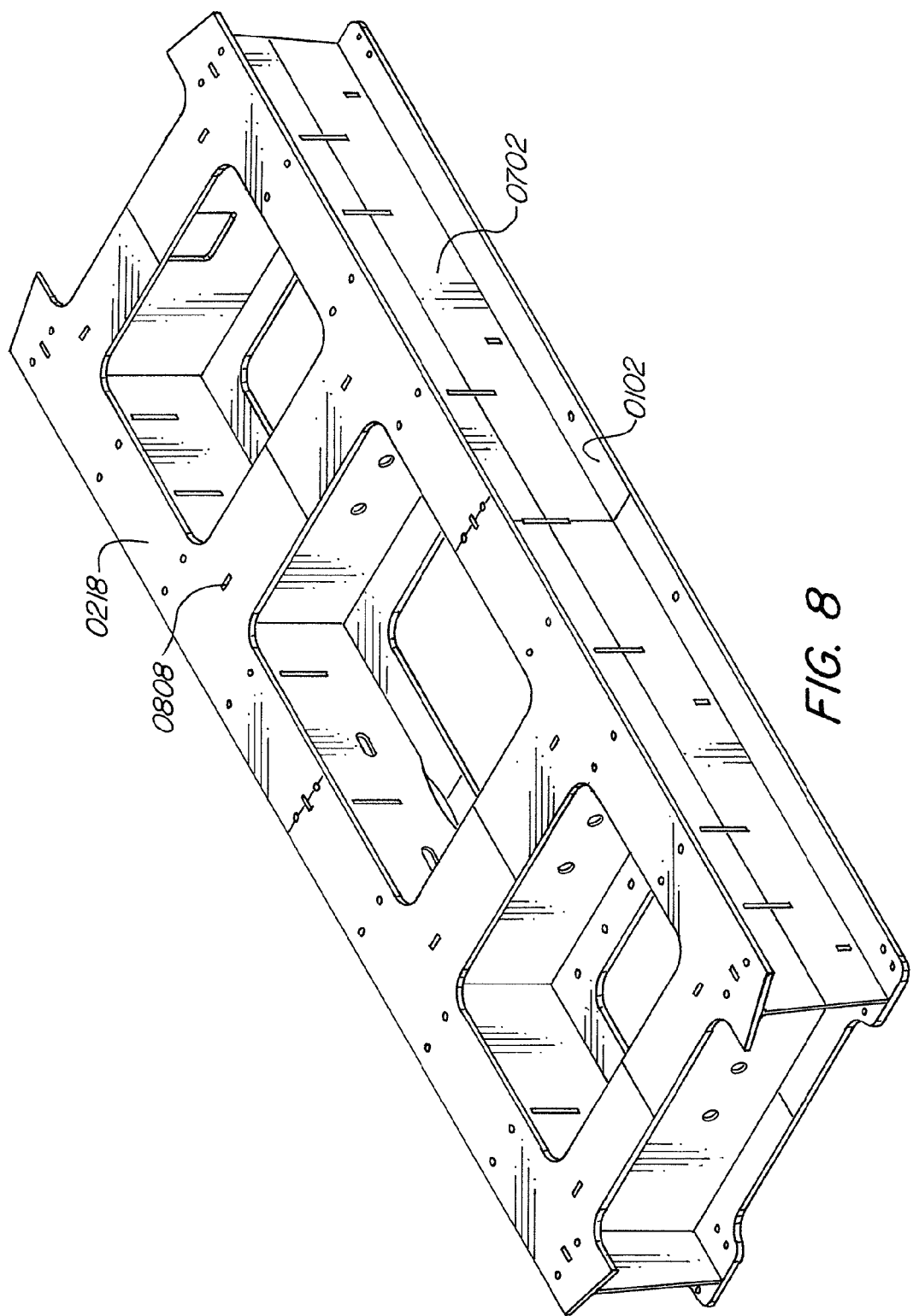
FIG. 8 is a perspective view of a partially completed turntable of FIG. 1.

FIG. 8 is a perspective view of a partially completed turntable of FIG. 1. A top horizontal member 0218 is placed on top of the longitudinal and lateral vertical members. Voids 0808 in the top horizontal member 0218 receive tabs from web members.

Figure 9:
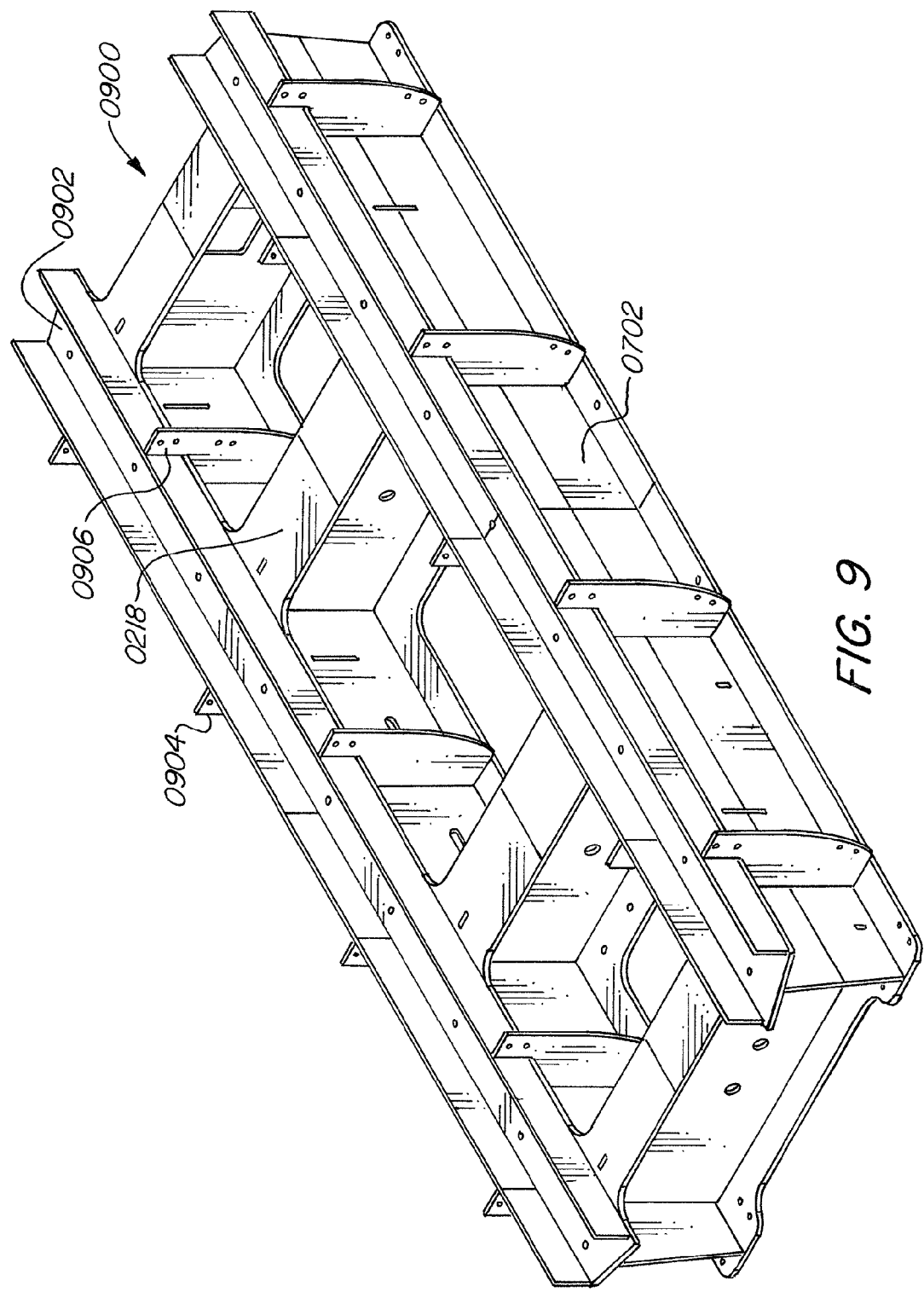
FIG. 9 is a perspective view of a partially completed turntable of FIG. 1.

FIG. 9 is a perspective view of a partially completed turntable of FIG. 1. The figure shows the support structure 0900 of the turntable without rails or side parts. Rail channels 0902 are affixed to the top horizontal member 0218. Inner and outer rail supports 0906 and 0904 respectively are affixed to the longitudinal web member 0702

Figure 10:
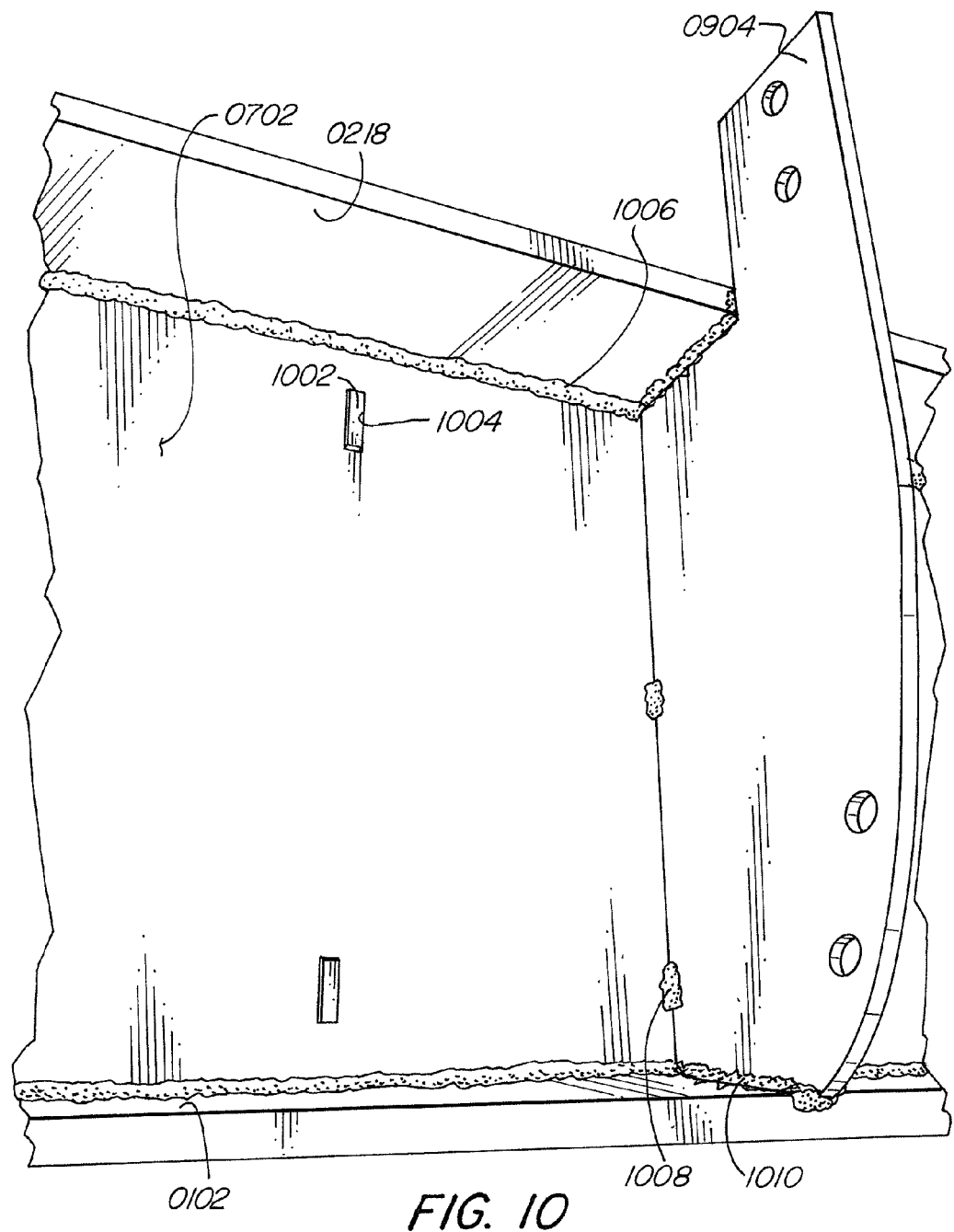
FIG. 10 is a detail view of a joint that is found in the turntable of FIG. 1.

FIG. 10 shows a tab 1002 inserted into a void 1004. Weld 1006 joins the vertical member 0702 to horizontal members 0102 and 0218. Weld 1008 and 1010 join the rail support 0904 to the web 0702 and the horizontal members 0102 and 0218.

Figure 11:
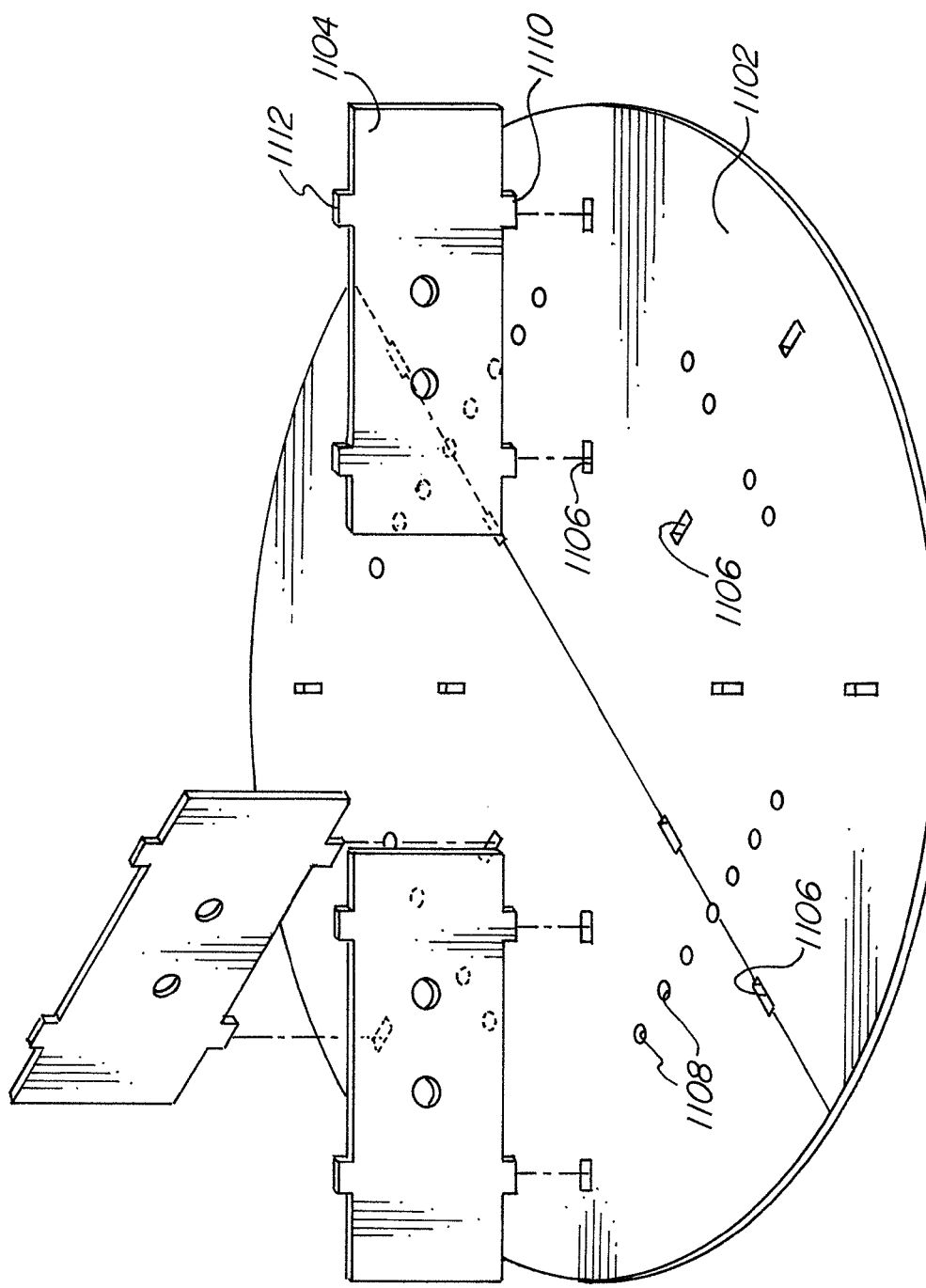
FIG. 11 is a perspective view of an alternate embodiment of the invention shown in FIG. 1.

FIG. 11 shows a bottom horizontal member 1102 having voids 1106 disposed in a radial pattern to receive protrusions 1110 of a plurality of vertical radial members 1104. Holes 1108 in the bottom horizontal member 1102 attach to a hub similar to the hub shown in previous figures. A top horizontal member (not shown) is located on top of the vertical radial members 1104, with protrusions 1112 extending into voids disposed in a radial pattern corresponding to the radial pattern of the bottom horizontal member 1102.

Although some of the drawings have shown a turntable having tracks, the turntable may be designed to rotate or position items other than railway vehicles and the turntable may be designed with no tracks. Other vehicles include material handling carts, repair cars, moveable machinery and the like as would be apparent to one of skill in the art.

Furthermore, the invention has been shown with horizontal members having voids and vertical members having protrusions. It is contemplated as within the scope of the invention that the horizontal member could have protrusions and the vertical members could have voids. Additionally, a horizontal or vertical member may have both voids and protrusions.

In the example of a turntable with no tracks the turntable may be designed to rotate a building structure, a vehicle or machinery on a factory floor. Additional vehicles, structures, machinery and the like are contemplated within the scope of the invention as would be apparent to one of skill in the art.

Although the invention has been described with reference to a particular arrangement of parts, features and the like, these are not intended to exhaust all possible arrangements or features, and indeed many modifications and variations will be ascertainable to those of skill in the art.

What is claimed is:

1. A turntable comprising:
   a hub having a plurality of holes; said holes adapted to receive bolts for affixing the hub to a foundation; and
   a support structure attached to said hub, said support structure comprising:
   a plurality of horizontal members having a plurality of voids, the plurality of voids including at least a first and second row of voids the first and second row of voids each including at least two of the plurality of voids;
   the first row of voids extending along a first direction, the second row of voids extending along a second direction perpendicular to the first direction;
   a plurality of vertical members each of said vertical members disposed between and substantially perpendicular to said horizontal members, at least two of said plurality of vertical members perpendicular to each other;
   a protrusion extending from an edge of each said vertical members, said protrusion inserted into one of said voids; and
   said vertical members joined to said horizontal members.

2. The turntable of claim 1 wherein said voids extend through said horizontal member.

3. The turntable of claim 1 wherein at least one of said horizontal members has holes therein for attaching said horizontal member to said hub.

4. The turntable of claim 1 further comprising a drive mechanism adapted to rotate said support structure about said hub.

5. The turntable of claim 1 further comprising a track attached to at least one of said horizontal members.

6. The device of claim 5 wherein said track is adapted to receive rail cars.

7. The device of claim 1 wherein:
   said turntable has two tracks, said tracks being perpendicular to each other; and
   said support structure supports each of said tracks.

8. The device of claim 1 further comprising:
   a side support affixed to said support structure; and
   at least one side part attached to an edge of said side support, said side part parallel to said horizontal member.

9. A turntable comprising:
   a hub having a plurality of holes; said holes adapted to receive bolts for affixing the hub to a foundation; and
   a support structure attached to said hub, said support structure comprising:
   a plurality of horizontal members having a plurality of rows of voids, each of said plurality of rows of voids including at least two voids, the rows of voids disposed in a radial pattern about each of said horizontal members such that each one of the plurality of rows of voids is disposed at an angle relative to at least another one of the plurality of rows of voids;
   a plurality of vertical members each of said vertical members disposed between and substantially perpendicular to said horizontal members;
   a protrusion extending from an edge of each said vertical members, said protrusion inserted into one of said voids; and
   said vertical members joined to said horizontal members.

10. The turntable of claim 9 wherein said voids extend through said horizontal member.

11. The turntable of claim 9 wherein at least one of said horizontal members has holes therein for attaching said horizontal member to said hub.

12. The turntable of claim 9 further comprising a drive mechanism adapted to rotate said support structure about said hub.

13. The turntable of claim 9 further comprising a track attached to one of said horizontal members.

14. A method of manufacturing a turntable said method comprising the steps of:
   providing a hub having a plurality of holes adapted to receive bolts for affixing said hub to a foundation;
   providing a plurality of vertical members each having an edge with a protrusion;
   providing a plurality of horizontal members each having a plurality of voids a first row of voids including two of the plurality of voids and a second row of voids including another two of the plurality of voids the first and second rows of voids disposed relative to each other such that a first line passing through the two of the plurality of voids intersects a second line passing through the another two of the plurality of voids;
   placing said plurality of vertical members substantially perpendicular to said plurality of horizontal members and between two of said plurality of horizontal members such that the protrusion in each said vertical member inserts into one of the plurality of voids in said horizontal member;

welding said vertical member to said horizontal member; and attaching said hub to one said horizontal members.

15. The method of claim 14 wherein said attaching step further comprises the step of providing bolts extending through holes in said hub and holes in one said horizontal members.

16. The method of claim 15 further comprising the step of affixing a drive mechanism to said turntable, said drive mechanism adapted to rotate the turntable.

17. The method of claim 14 wherein the first line is perpendicular to the second line.

18. The method of claim 14 wherein an end of one of said plurality of vertical members is welded to a side of another one of said plurality of vertical members.

* * * * *